(12) United States Patent
Shalev et al.

(10) Patent No.: US 10,489,479 B1
(45) Date of Patent: Nov. 26, 2019

(54) MATRIX MULTIPLICATION ENGINE

(71) Applicant: Habana Labs Ltd., Tel Aviv (IL)

(72) Inventors: Ron Shalev, Pardes Hanna-Karkur (IL); Sergei Gofman, Haifa (IL); Amos Goldman, Pardes Hanna-Karkur (IL); Tomer Rothschild, Ein-Vered (IL)

(73) Assignee: Habana Labs Ltd., Caesarea (IL)

( * ) Notice: Subject to any disclaimer, the term of this patent is extended or adjusted under 35 U.S.C. 154(b) by 0 days.

(21) Appl. No.: 15/700,207

(22) Filed: Sep. 11, 2017

Related U.S. Application Data

(60) Provisional application No. 62/393,121, filed on Sep. 12, 2016.

(51) Int. Cl.
*G06F 17/16* (2006.01)
*G06F 7/523* (2006.01)
*G06F 17/12* (2006.01)

(52) U.S. Cl.
CPC .............. *G06F 17/16* (2013.01); *G06F 7/523* (2013.01); *G06F 17/12* (2013.01)

(58) Field of Classification Search
CPC ....................................................... G06F 17/16
USPC ........................................................ 708/607
See application file for complete search history.

(56) References Cited

U.S. PATENT DOCUMENTS

2015/0269122 A1* 9/2015 Lang .................. G06Q 30/0269
708/607
2017/0344514 A1* 11/2017 Zhou ....................... G06F 17/16

OTHER PUBLICATIONS

S. Chetlur, et al., cuDNN: Efficient Primitives for Deep Learning, arXiv:1410.0759v3 [cs.NE] 2014, p. 1-9 (Year: 2014).*
N. Suda, et al., Throughput-Optimized OpenCL-based FPGA Accelerator for Large-Scale Convolutional Neural Networks, FPGA'16, Feb. 21-26, 2016, p. 16-25 (Year: 2016).*
F. Abuzaid, et al., Caffe con Troll: Shallow ideas to Speed Up Deep Learning, arXiv:1504.043343v1 [cs.LG], 2015. (Year: 2015).*
X. Yang, et. al., A Systematic Approach to Blocking Convolutional Nueral Networks, arXiv:1606.04209v1 [cs.DC] Jun. 14, 2016, p. 1-12. (Year: 2016).*
Shalev et al., U.S. Appl. No. 15/700,213 dated Sep. 11, 2017.

* cited by examiner

*Primary Examiner* — Andrew Caldwell
*Assistant Examiner* — Emily E Larocque
(74) *Attorney, Agent, or Firm* — Kligler & Associates

(57) ABSTRACT

Computational apparatus includes a memory, which contains first and second input matrices of input data values, having at least three dimensions including respective heights and widths in a predefined sampling space and a common depth in a feature dimension, orthogonal to the sampling space. An array of processing elements each perform a multiplication of respective first and second input operands and to accumulate products of the multiplication to generate a respective output value. Data access logic extracts first and second pluralities of vectors of the input data values extending in the feature dimension from the first and second input matrices, respectively, and distributes the input data values from the extracted vectors in sequence to the processing elements so as to cause the processing elements to compute a convolution of first and second two-dimensional matrices composed respectively of the first and second pluralities of vectors.

18 Claims, 6 Drawing Sheets

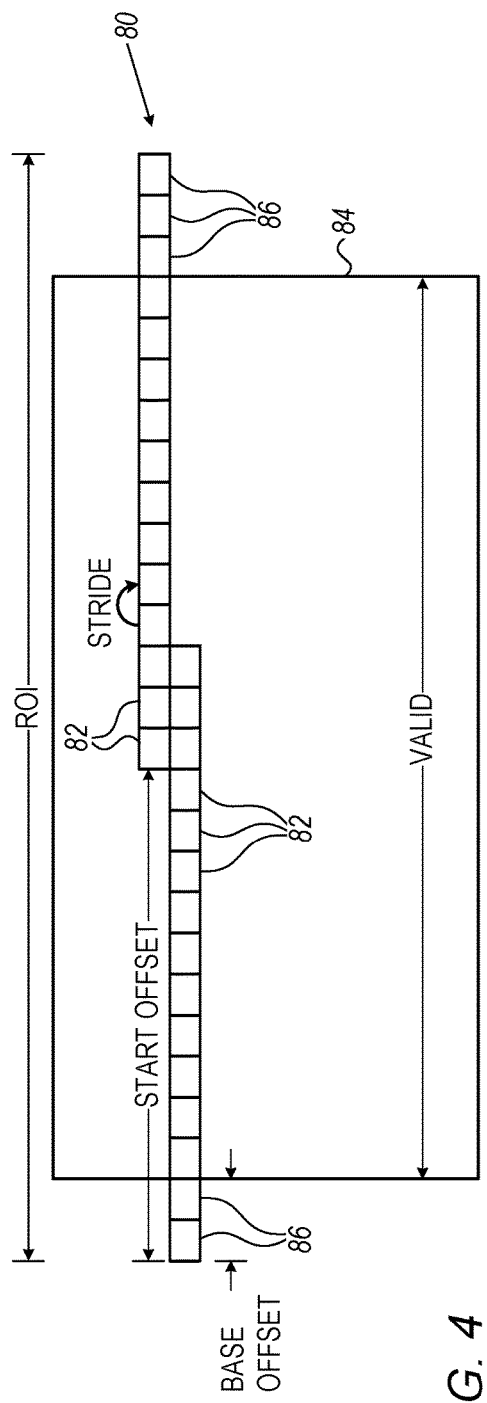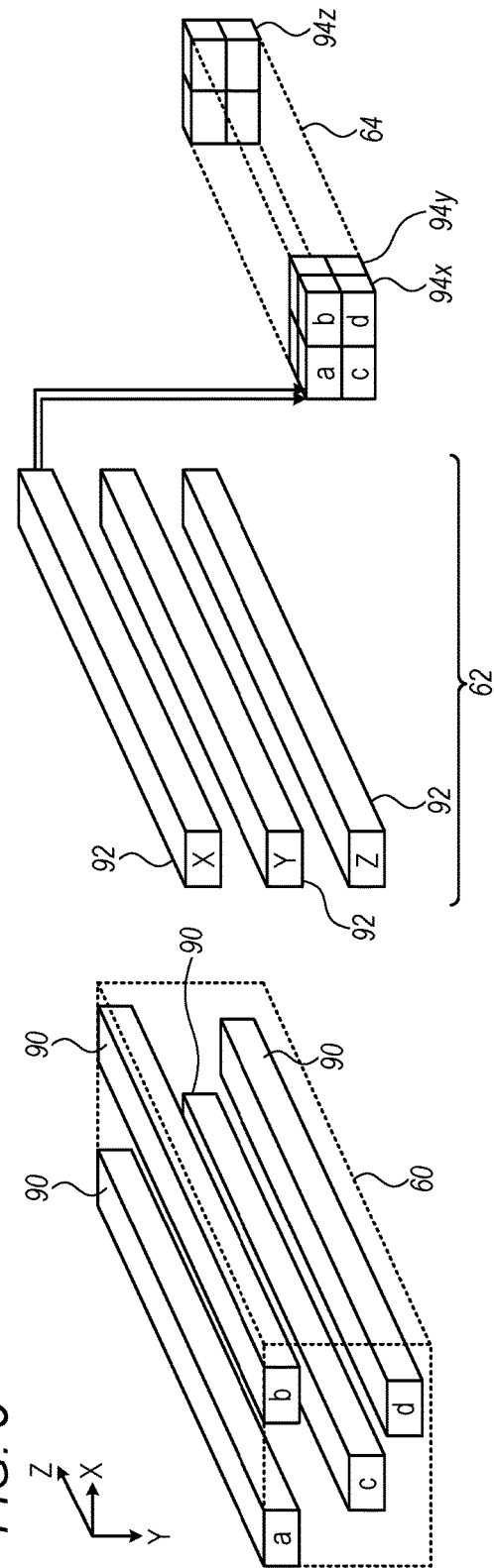
FIG. 4
FIG. 5

MATRIX MULTIPLICATION ENGINE

CROSS-REFERENCE TO RELATED APPLICATION

This application claims the benefit of U.S. Provisional Patent Application 62/393,121, filed Sep. 12, 2016, which is incorporated herein by reference.

FIELD OF THE INVENTION

The present invention relates generally to computational devices, and specifically to apparatus and methods for high-speed parallel computations.

BACKGROUND

Multi-dimensional convolutions are a basic building block in many applications. For example, convolutional neural nets (CNNs) are being used increasingly in complex classification and recognition tasks, such as large-category image classification, object recognition, and automatic speech recognition.

In the convolutional layers of the CNN, a three-dimensional (3D) array of input data (commonly referred to as a 3D matrix or tensor) of dimensions M×N×D is convolved with a four-dimensional tensor made up of L kernels of dimensions j×k×D and stride S. Here M and N are the dimensions of the sampling space (also referred to as the X- and Y-dimensions), for example pixels of an image, while D (also referred to herein as the Z-dimension) is the number of input feature values given for each sample. Each 3D kernel is shifted in strides of size S across the input volume. Following each shift, every weight belonging to the 3D kernel is multiplied by each corresponding input element from the overlapping region of the 3D input array, and the products are summed to create an element of a 3D output array.

General-purpose processors are not capable of performing these computational tasks efficiently. For this reason, special-purpose hardware architectures have been proposed, with the aim of parallelizing the large numbers of matrix multiplications that are required by the CNN.

SUMMARY

Embodiments of the present invention that are described hereinbelow provide improved apparatus and methods for performing parallel computations over large arrays of data.

There is therefore provided, in accordance with an embodiment of the invention, computational apparatus, including a memory, which is configured to contain first and second input matrices of input data values, having at least three dimensions including respective heights and widths in a predefined sampling space and a common depth in a feature dimension, orthogonal to the sampling space. Each of an array of processing elements is configured to perform a multiplication of respective first and second input operands and to accumulate products of the multiplication to generate a respective output value. Data access logic is configured to extract first and second pluralities of vectors of the input data values extending in the feature dimension from the first and second input matrices, respectively, and to distribute the input data values from the extracted vectors in sequence to the processing elements so as to cause the processing elements to compute a convolution of first and second two-dimensional (2D) matrices composed respectively of the first and second pluralities of vectors.

In some embodiments, the data access logic is configured to transpose at least one of the 2D matrices before distributing the input data values. For example, the first 2D matrix is transposed so that the vectors in the first plurality are arranged as columns of the first 2D matrix, while the vectors in the second plurality are arranged as rows of the second 2D matrix.

Additionally or alternatively, the sequence in which the input data values are distributed to the processing elements is selected so that the array of processing elements computes respective outer products of a succession of vector pairs, each vector pair including a first vector selected from the first plurality and a second vector selected from the second plurality, and sums the outer products to generate a third matrix representing a result of the convolution. In a disclosed embodiment, the data access logic is configured to broadcast the input data values in each vector pair to the processing elements so that each input data value is distributed to multiple processing elements, such that in each of a succession of processing cycles, the array of the processing elements computes all matrix elements of an outer product of the first and second vectors.

In some embodiments, the data access logic is configured to retrieve the vectors of the input data values from non-neighboring locations in the sampling space. In a disclosed embodiment, the locations in the sampling space are separated by a predefined stride or dilation.

In a disclosed embodiment, the data access logic is configured to extract the first and second pluralities of the vectors beginning from respective start offsets that are not aligned with boundaries of the first and second input matrices in the sampling space. Additionally or alternatively, the data access logic is configured to extract the first and second pluralities of the vectors from respective regions of interest that contain the first and second input matrices and include margins extending beyond respective boundaries of the first and second matrices in the sampling space, while inserting specified padding values in the vectors that are extracted from the margins.

There is also provided, in accordance with an embodiment of the invention, a computational method, which includes storing in a memory first and second input matrices of input data values, having at least three dimensions including respective heights and widths in a predefined sampling space and a common depth in a feature dimension, orthogonal to the sampling space. First and second pluralities of vectors of the input data values extending in the feature dimension are extracted from the first and second input matrices, respectively. The input data values from the extracted vectors are distributed in sequence to an array of processing elements, each configured to perform a multiplication of respective first and second input operands and to accumulate products of the multiplication to generate a respective output value. The distributed data values are multiplied, and the products are accumulated in the processing elements so as to compute a convolution of first and second two-dimensional (2D) matrices composed respectively of the first and second pluralities of vectors.

The present invention will be more fully understood from the following detailed description of the embodiments thereof, taken together with the drawings in which:

BRIEF DESCRIPTION OF THE DRAWINGS

FIG. 4 is a block diagram that schematically illustrates a method for extraction of a vector of data for input to a matrix multiplication engine, in accordance with an embodiment of the invention;

FIG. 5 is a block diagram that schematically illustrates a process of convolution, in accordance with an embodiment of the invention.

DETAILED DESCRIPTION OF EMBODIMENTS

Overview

Figure 1:
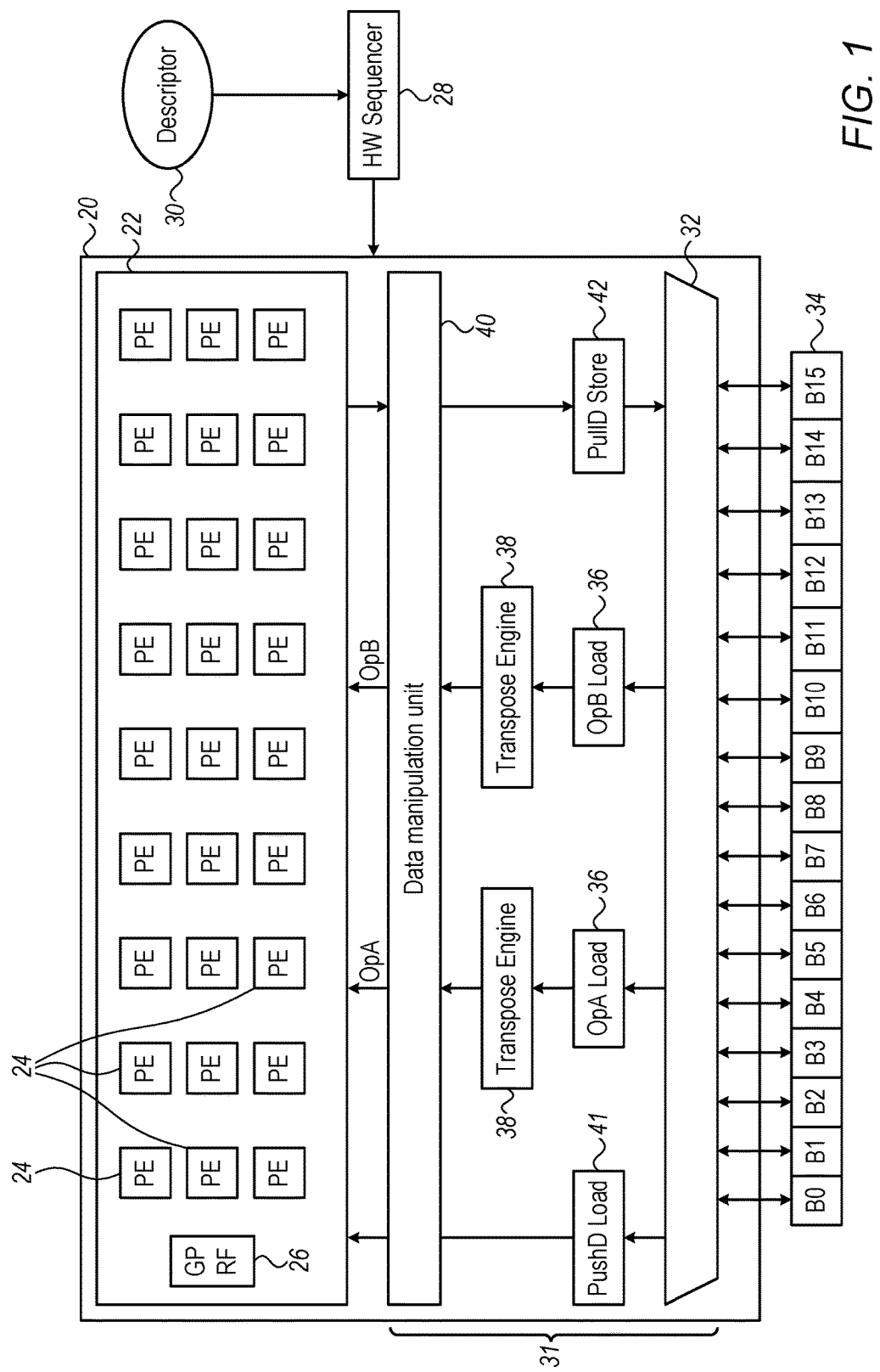
FIG. 1 is a block diagram that schematically illustrates a matrix multiplication engine, in accordance with an embodiment of the invention.

Embodiments of the present invention that are described herein provide a novel hardware architecture, which can be applied in efficient computation of convolutions. The architecture is based on an array of processing elements, which perform multiply and accumulate operations, along with novel data access logic for loading and arranging data for processing by the elements. As will be described in detail hereinbelow, a processor constructed in accordance with this architecture can perform multi-dimensional convolutions over selected segments of the sampling space, while making efficient use of the full computational capabilities of the processing elements. Such processors are particularly useful in accelerating deep learning computations, for example, but the principles of the processor architecture can be advantageously used in other applications, as well.

Processors in accordance with the disclosed embodiments achieve high efficiency and flexibility by retrieving and operating on stored data in a Z-major mode, meaning that the processor selects, retrieves and operates on vectors of data extending in the feature (Z) dimension, orthogonal to the spatial dimensions (X,Y) of the data volume. The processing elements perform their computational functions over 2D matrices composed of these selected vectors. The data access logic transposes the matrices as required so that each of the processing elements receives and multiplies the appropriate pair of matrix elements in every processing cycle and accumulates the result into a corresponding element of the output matrix.

In the disclosed embodiments, computational apparatus comprises a memory, which contains 3D matrices of input data values, representing data structures such as 3D tensors or 3D components of tensors of order four or more. (In the description that follows and in the claims, the term "matrix" is used for the sake of generality to refer to the data structures and algebraic operations that are carried out, although in most cases these matrices represent tensors.) The heights and widths of the 3D matrices that are to be convolved are defined in a certain sampling space, referred to as the X-Y plane (such as pixels in an image plane), while the matrices share a common depth in the feature dimension, referred to as the Z-dimension, orthogonal to the sampling space. An array of processing elements performs multiply-accumulate operations over the data, wherein each processing element is configured to multiply a respective pair of input operands and to accumulate products of the multiplication over multiple cycles in order to generate a respective output value.

For the sake of concreteness and clarity, the description that follows refers to convolutions between 3D matrices. In fact, when L different kernels are applied in the convolution (as explained above in the Background section), the disclosed apparatus will effectively convolve a 3D matrix with a 4D matrix. As another example, when the input data extend over a fourth dimension, such as the time dimension in a sequence of images or other complex data, the disclosed apparatus will be used to convolve together a pair of 4D matrices. Application of the apparatus described herein to matrices of four or more dimensions makes use of the 3D "building blocks" that are described hereinbelow, as will be apparent to those skilled in the art after reading this description, and is considered to be within the scope of the present invention.

To perform a convolution operation between a pair of matrices of three (or more) dimensions, representing tensors (or parts of tensors) of three or more dimensions, for example, the data access logic extracts sets of vectors of input data values, extending in the feature dimension, from the matrices in the memory. Each such vector, in other words, is a one-dimensional array of feature values belonging to a given (X,Y) location in the sampling space. The data access logic distributes these extracted data values to the processing elements in a sequence that is chosen, as explained in detail hereinbelow, so as to cause the processing elements to compute a convolution of a pair of 2D matrices that are composed respectively of the two sets of vectors.

In other words, the vectors of feature values in each set are effectively stacked together by the data access logic so as to make up a matrix, which is multiplied with the corresponding matrix from the other set, for example as part of a convolution computation. For matrices that are small (in comparison to the number of processing elements) or convolutions made with a large stride, this sort of procedure may be sufficient to compute the entire convolution of the matrices in a single pass. Alternatively, for larger computations, the steps of vector extraction and multiplication may be repeated to perform multiple 2D convolutions over sets of feature-direction vectors extracted from different parts of the 3D matrices, and the results combined to give the output matrix.

In some embodiments, the data access logic transposes at least one of the 2D matrices before distributing the extracted data values to the processing elements. Typically, one 2D matrix can be transposed so that the vectors in the corresponding set are arranged as columns of the matrix, while the vectors in the other set are arranged as rows of the other matrix.

As is illustrated in the figures, the data access logic is capable of flexibly choosing the vectors of data values to extract, and thus the computations made by the apparatus need not be limited to vectors taken from neighboring locations in the sampling space. The start location, length, and stride of such a set of vectors can be programmed to have substantially any suitable values in the sampling space. Thus, the apparatus can be programmed to perform convolutions between input data matrices with various different stride and/or dilation values, depending upon application requirements.

System Description

FIG. 1 is a block diagram that schematically illustrates a matrix multiplication engine 20, in accordance with an embodiment of the invention. The elements of this matrix multiplication engine are typically implemented in dedicated hardware logic circuits in an integrated circuit chip or chip set. The hardware logic circuits may be hard-wired or programmable. Alternatively or additionally, some of the functions illustrated in FIG. 1 may be carried out in software or firmware by a programmable processor.

Figure 2:
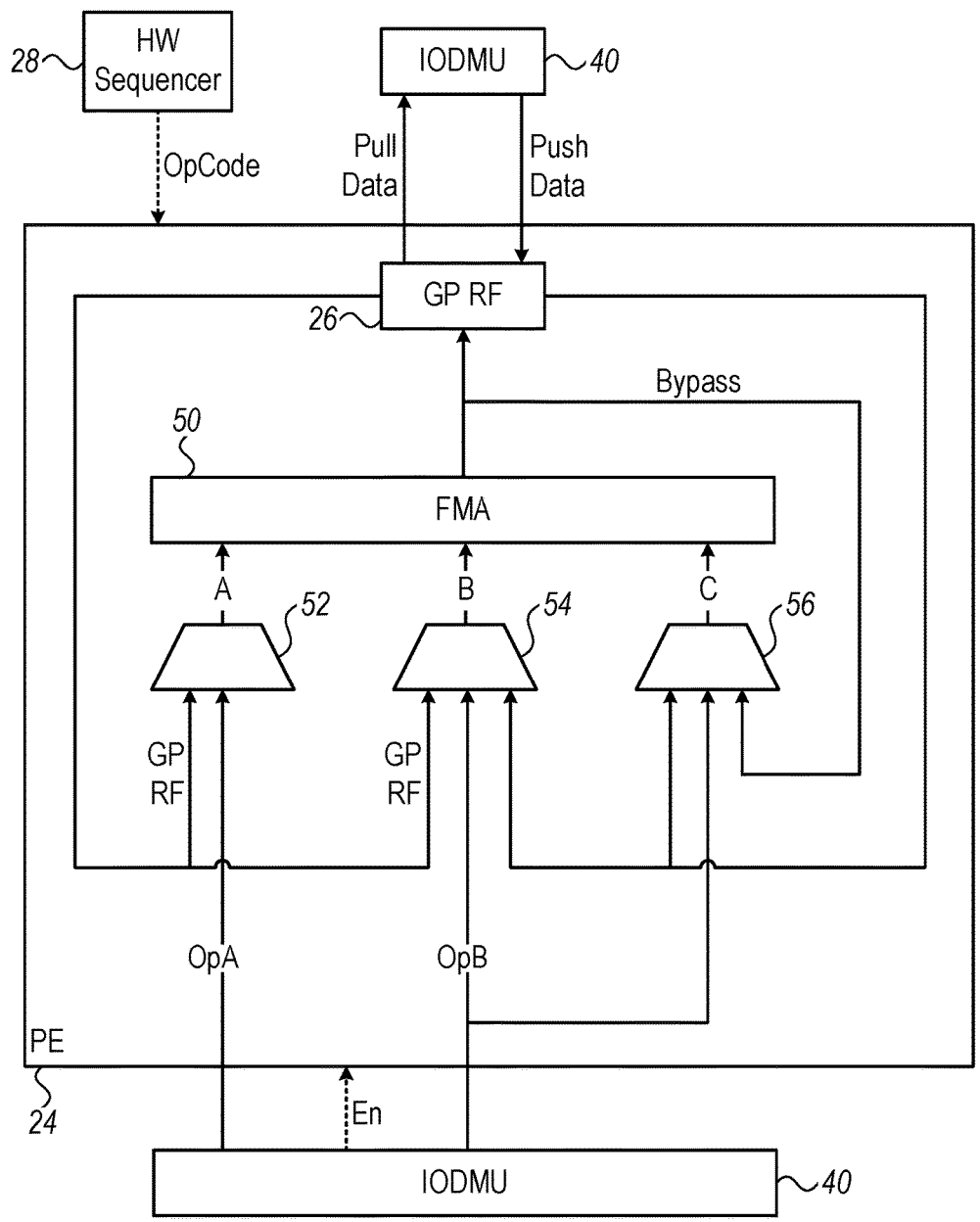
FIG. 2 is a block diagram that schematically illustrates a processing element in a matrix multiplication engine, in accordance with an embodiment of the invention.

Computations in engine 20 are carried out by an execution unit 22, comprising an array of processing elements 24, which perform multiply and accumulate operations while reading and writing data to a general-purpose register file (GP RF) 26. Details of the design and operation of processing elements 24 are shown in FIG. 2. Although GP RF 26 is shown in FIG. 1, for the sake of simplicity, as a single block, the registers in the GP RF are, in fact, distributed among processing elements 24. Furthermore, although execution unit 22 is shown in FIG. 1, for the sake of example, as containing a certain number of rows and columns of processing elements 24, in practice the execution unit may comprise a grid of processing elements with any desired numbers of rows and columns. For example, in one embodiment, execution unit 22 comprises 512 processing elements. In general, the number of rows and columns of processing elements 24 determines the sizes of the matrices that execution unit 22 can convolve in a single pass, since each processing element is responsible for computing the output value of a respective element of the product matrix. Larger matrices can be broken into smaller chunks for processing by execution unit 22.

A hardware sequencer 28 provides commands to execution unit 22 and to data access logic 31, which extracts and distributes input data values to processing elements 24 from 3D matrix data held in a memory 34. Descriptors 30 indicate the operations that are to be performed and the ranges of data over which execution unit 22 is to perform the operations. These operations typically include at least the following:

$C=\alpha AB+\beta C$ $C=\alpha AB^T+\beta C$ $C=\alpha A^T B+\beta C$ $C=\alpha A^T B^T+\beta C$ Here A, B and C are matrices, $\alpha$ and $\beta$ are scalars, and $A^T$ means that matrix A is transposed. Descriptors 30 may be written by a human programmer of engine 20 or generated automatically, for example by a central processing unit (CPU) or system controller (not shown), based on a definition of the required computational tasks. Engine 20 carries out the commands of hardware sequencer 28 in order, and writes the computational results (matrix C) back to memory 34.

Data access logic 31 in engine 20 comprises a memory controller 32, which reads from and writes to memory 34, along with load units 36 and 41, transpose engines 38, an input/output data manipulation unit (IODMU) 40, and a store unit 42. For efficient data access, memory 34 is tightly coupled to controller 32, with multiple banks (labeled B0 through B15) having respective input/output connections to controller 32. In accordance with descriptors 30, load units 36 instruct memory controller 32 to extract vectors of input data values to serve as operands A and B. These values are then distributed among processing elements 24 by data manipulation unit 40. Examples of these data extraction, manipulation and distribution functions are described hereinbelow with reference to FIGS. 3A/B and 4.

Prior to distribution of the input data values to processing elements 24, transpose engines 38 transpose one or both of the vectors from row to column form. Assuming memory controller 32 retrieves the input data values row by row, for example, transpose engine 38 will receive and save a sufficient number of rows to be able to read out columns of data of the appropriate length to data manipulation unit 40, for delivery to processing elements 24.

The commands to execution unit 22 also indicate to processing elements 24 which entry in GP RF 26 should be used in each computational step. A push data load unit 41 loads specified data from memory 34 into GP RF 26 as required for each computation, while a pull data store unit 42 reads the output values from the appropriate entries GP RF 26 and stores them in memory 34.

FIG. 2 is a block diagram that schematically shows details of one of processing elements 24, in accordance with an embodiment of the invention. The core of processing element 24 in this embodiment is a fused multiplier-adder (FMA) 50, as is known in the art, which receives three inputs, labeled A, B and C, and outputs a result to a designated entry in GP RF 26. FMA 50 is advantageous in its ability perform multiply-accumulate operations (of the form $C<=A\times B+C$) efficiently, but other sorts of multiplier-accumulators may alternatively be used.

A set of multiplexers 52, 54 and 56 provide inputs A, B and C to FMA 50. The multiplexers are configured according to operation codes (opcodes) provided at each cycle by sequencer 28. Thus, multiplexer 52 may provide either operand A from data manipulation unit 40 or a value stored in GP RF 26 as input A; either operand B or a value read from either of two ports of GP RF 26 as input B; and either operand B, a value stored in GP RF 26, or the direct output of FMA 50 as input C. (This latter direct output is referred to in the figure as a "bypass" value.) Data manipulation unit 40 raises an enable (En) flag to signal to processing element 24 that the input data values are valid. The use of multiple entries and multiple ports in GP RF 26 makes it possible for different computations, as well as data push and pull operations, to be interleaved, thus enabling full utilization of the computational capabilities of FMA 50.

The description that follows presents various techniques for extraction and manipulation of tensor data in engine 20. These techniques are described, for the sake of concreteness and clarity, with reference to the specific design of engine 20 that is shown in FIGS. 1 and 2 and described above in detail. The principles of these techniques, however, may likewise be applied in other computational accelerators having appropriate arrays of multiplier-accumulators, as are known in the art. All such alternative implementations are considered to be within the scope of the present invention.

Data Extraction and Manipulation

Figure 3A:
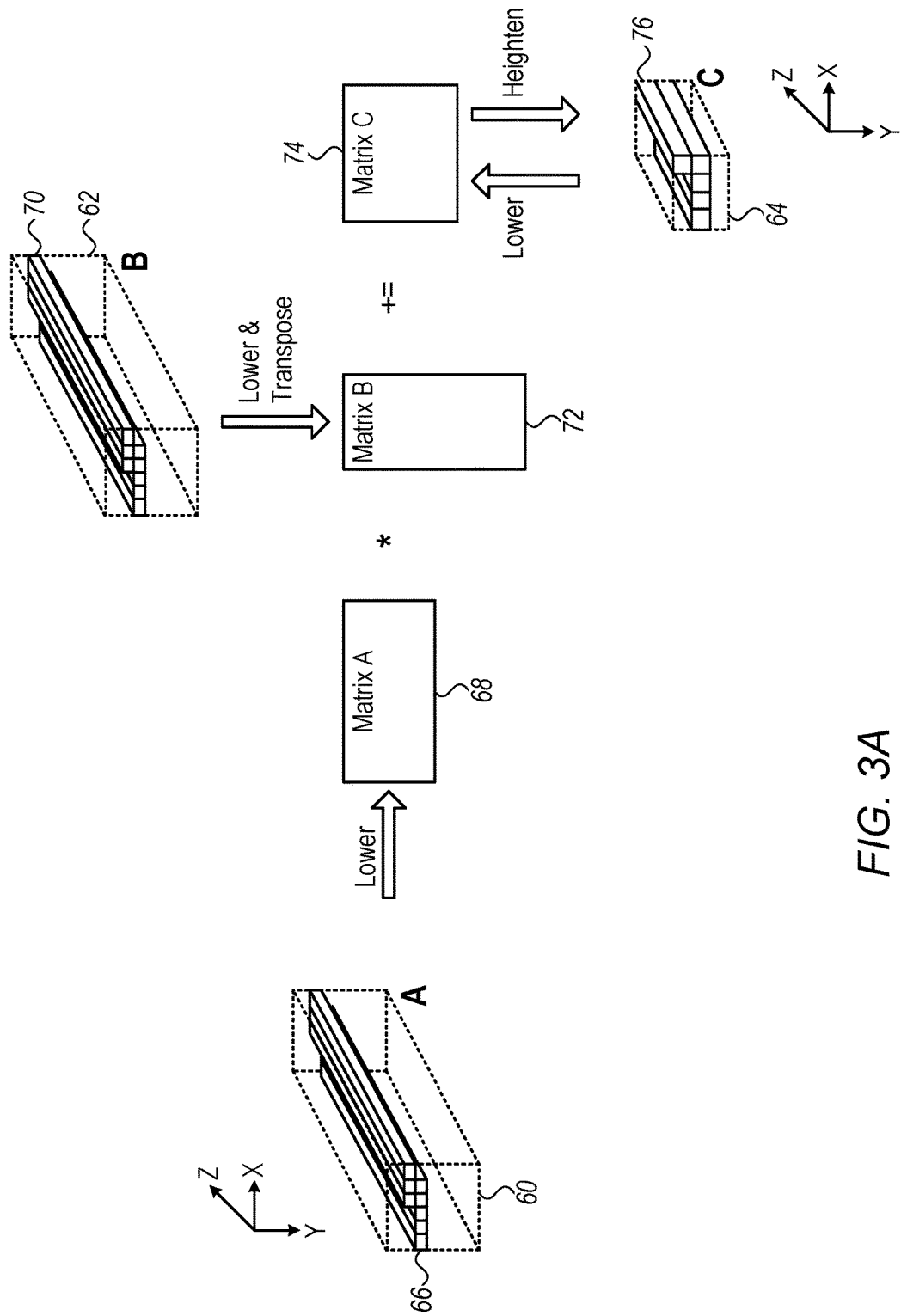
FIG. 3A is a block diagram that schematically illustrates a process of matrix multiplication, in accordance with an embodiment of the invention.

FIG. 3A is a block diagram that schematically illustrates a process of matrix multiplication carried out by engine 20, in accordance with an embodiment of the invention. In this example, engine 20 receives two input tensors 60 (tensor A) and 62 (tensor B) that are to be multiplied together, to generate an output tensor 64 (tensor C). Tensors 60 and 62 in this example are shown as 3D matrices, each having a certain width and height in a certain sampling space, which is identified in FIG. 3A as the X-Y plane. (The widths and heights of the two matrices are not necessarily the same, although they appear in the figure to be approximately equal. Although the tensors are shown as three-dimensional, due to graphical limitations, one or both tensors may, in fact, be of higher dimensionality.) The parts of tensors 60 and 62 that are to be involved in the computation have a common depth in the Z-direction, which is the feature dimension. The successive planes in the Z-direction typically represent different features, such as the different color components of pixels of an image, or the pixel feature values obtained in a previous computational stage by convolving an input image with a set of kernels.

To multiply tensors 60 and 62 together, data access logic 31 in engine 20, extracts sub-tensors comprising sets of vectors 66 and 70 of input values, extending in the Z-direction, from tensors 60 and 62, respectively. Data access logic 31 "lowers" these sub-tensors into 2D matrices 68 and 72, whose elements will then be broadcast by data manipulation unit 40 to processing elements 24 for multiplication and accumulation. Prior to distribution of the input values to processing elements 24, transposition engine 38 transposes matrix 72. Thus, vectors 66 in this example are arranged as rows of matrix 68, while vectors 70 are arranged as columns of matrix 72. In this manner, execution unit 22 computes the convolution of matrices 68 and 72 to generate an output matrix 74.

It is desirable, for efficient computation, that the dimensions of matrices 68 and 72 fit the dimensions of the array of processing elements. Since the widths and heights of tensors 60 and 62 do not necessarily match the dimensions of the array of processing elements 24 in execution unit 22, data access logic 31 may start and finish extracting vectors 66 and 70 at substantially any locations within the tensors in order to assemble matrices 68 and 72. Thus, in the pictured example, the sub-tensors extracted from tensors 60 and 62 are not single, 2D slices of the tensors, but rather may include vectors from non-neighboring locations in the X-Y plane, such as vectors from two or more successive slices. Data access logic 31 may extract and lower multiple, successive sub-tensors of this sort in order to complete the multiplication operation over the entire volumes of tensors 60 and 62. Details of this data extraction and lowering process are described hereinbelow with reference to FIGS. 4 and 5.

After computation of output matrix 74 is complete, data access logic 31 heightens the matrix elements into a sub-tensor of vectors 76 within output tensor 64. This heightening operation is the inverse of the lowering operation described above. The dimensions of tensor 64, and thus the locations to which vectors 76 are heightened, depend upon the heights and widths of input tensors 60 in the X- and Y-dimensions.

Figure 3B:
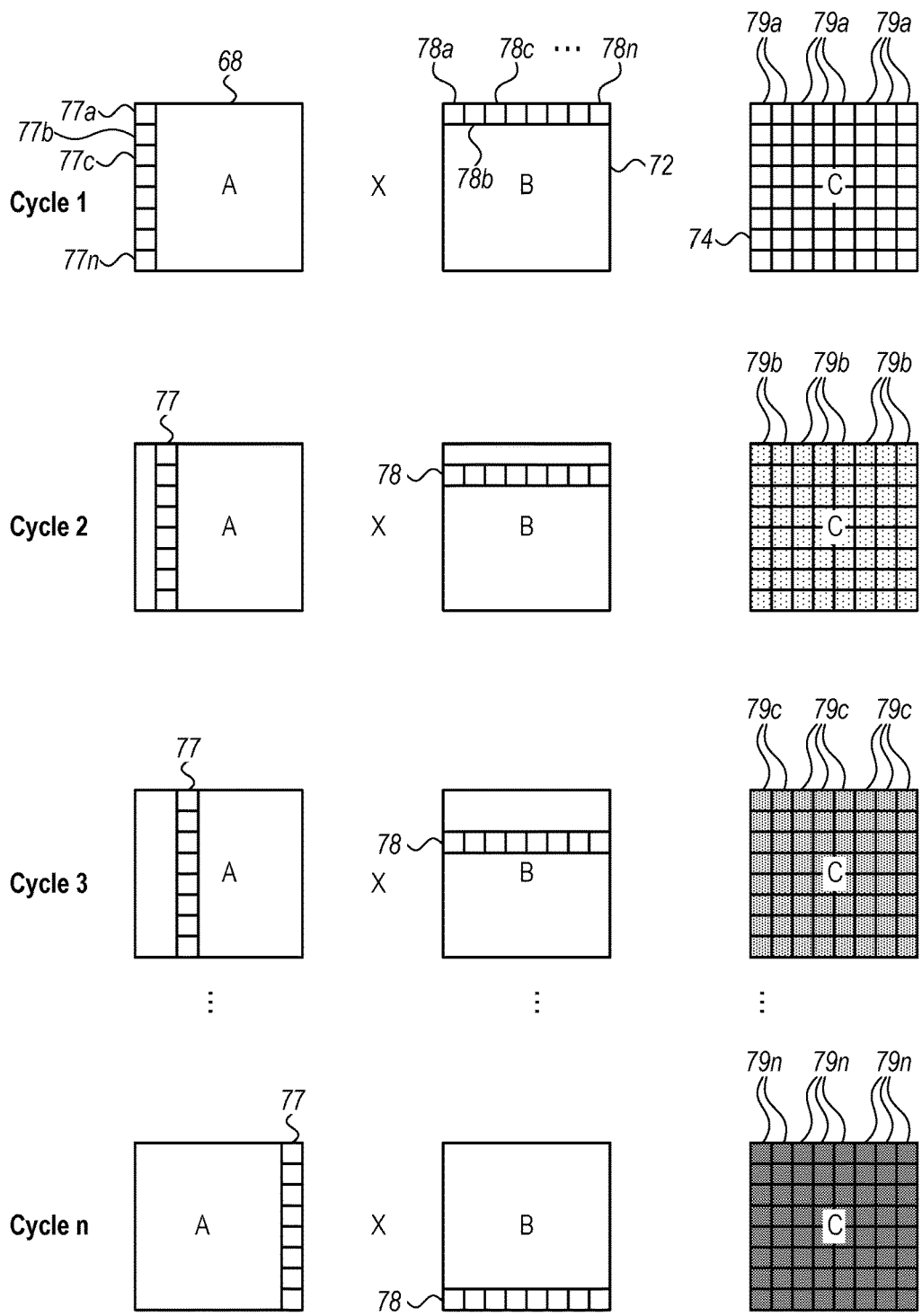
FIG. 3B is a block diagram that schematically illustrates successive stages in a process of matrix multiplication carried out by an array of processing elements, in accordance with an embodiment of the invention.

FIG. 3B is a block diagram that schematically illustrates successive stages in a process of matrix multiplication carried out by processing elements 24 in execution unit 22, in accordance with an embodiment of the invention. In this example, for the sake of simplicity, matrices 68 and 72 are assumed to be square, with dimensions n×n. Execution unit 22 is likewise assumed to comprise an array of n×n processing elements 24. Each multiply-accumulate stage is assumed to require a single cycle of execution unit 22, and FIG. 3B shows the data inputs and outputs of each such stage in succession, up to the nth stage, at which the computation is completed. (In practice, due to data transfer latencies, each stage may require multiple clock cycles, for example four clock cycles, and the term "cycle" will be used loosely in the description that follows and in the claims to refer to a logical, computational cycle of a repetitive operation, rather than referring strictly to a clock cycle.)

In the example shown in FIG. 3B, execution unit 22 carries out a convolution between matrices 68 and 72, by computing and summing a sequence of outer products of vectors 77 and 78, which are selected respectively from matrices 68 and 72. As explained earlier, each such vector in matrices 68 and 72 corresponds to a one-dimensional vector of data values extending in the Z-direction in tensor 60 or 62. Vector 77 comprises data values 77*a*, 77*b*, 77*c*, . . . , 77*n*, which are arranged by transposition as a column of matrix 68, while vector 78 comprises a row of data values 78*a*, 78*b*, 78*c*, . . . , 78*n*. In each cycle, execution unit 22 computes the outer products of a different vector pair of this sort, while data manipulation unit 40 steps to a new column and a new row of matrices 68 and 72, respectively. The resulting outer products are accumulated, cycle by cycle, to elements 79 of output matrix 74, so that at the conclusion of all n stages, matrix 74 contains the final result of the convolution.

Each processing element 24 is responsible for computation of a single, corresponding element 79 of output matrix 74, by successive multiplication and accumulation of the appropriate elements of vectors 77 and 78 at each cycle. To facilitate this computation, data manipulation unit 40 broadcasts data values 77*a*, 77*b*, 77*c*, . . . , 77*n*, and 78*a*, 78*b*, 78*c*, . . . , 78*n* to processing elements 24 such that each retrieved data value is distributed to multiple processing elements. In other words, in each stage, all of the processing elements in the first row of the array of processing units 24 in execution unit 22 receive and multiply element 77*a* by a corresponding element from vector 78, while all of the processing elements in the first column multiply a corresponding element from vector 77 by element 78*a*, and so forth. Thus, in each processing cycle, the array of processing elements 24 computes all of the matrix elements of the outer product of vectors 77 and 78 in that processing cycle and sums the product with the result of the previous stage until the convolution is completed.

FIG. 4 is a block diagram that schematically illustrates a method for extraction of a matrix 80 of data from a tensor 84 for input to execution unit 22, in accordance with an embodiment of the invention. Specifically, FIG. 4 illustrates the operation of an address generation function of load units 36 and 41 and store unit 42, which enables execution unit 22 to operate on arbitrary sub-tensors within an input or output tensor. FIG. 4 is a cross-section of a tensor in the X-Y plane, and each data value 82 shown in the figure thus represents a vector of data values extending in the Z-direction. Matrix 80 comprises a stack of these vectors. For the sake of simplicity, the vectors in matrix 80 are taken from neighboring locations in the sampling space, i.e., with stride=1, but the principles of this embodiment may be extended in a straightforward manner to larger strides.

The cross-section of tensor 84 defines a region of valid data, which is extended by dummy elements 86 in the margins extending outward on either side to create a region of interest (ROI). These dummy elements are often needed in order to extend the convolution computation to cover areas near the edges of the tensor. The size of the margin of the ROI surrounding the data is defined by a base offset value, while dummy elements 86 are assigned to contain a padding value. These values may be preconfigured, or they may be specified in descriptor 30.

The beginning value (or vector location) 82 is indicated by a start offset, measured from the edge of the ROI, which may likewise be indicated by the descriptor and need not be aligned with the boundaries of the ROI or of tensor 84 in the sampling space. This start offset may correspond to the next location following the sub-tensor that was extracted and processed previously. Given the start offset and the known size of the ROI, load unit 36 is able to count and extract a number of vectors equal to the number of rows or columns (depending upon whether or not matrix 80 is to be transposed) of processing elements 24 that are to be involved in the computation. By extracting matrix 80 in this fashion, data access logic 31 ensures that the entire array of processing elements 24 will be exploited, thus maximizing the computational throughput of engine 20.

FIG. 5 is a block diagram that schematically illustrates a process of convolution carried out by engine 20, in accordance with an embodiment of the invention. As illustrated in this example, engine 20 is not limited to any particular stride and can even be programmed to extract vectors 90 from input tensor 60 at arbitrary locations in the X-Y plane. The four vectors 90 are stacked to create a 4×n matrix, which is convolved in engine 20 with multiple kernels of dimension n×1 corresponding to vectors 92, extracted from tensor 62. Each such kernel, labeled x, y, . . . , z in the figure, contributes a corresponding layer 94x, 94y, . . . , 94z in output tensor 64.

Figure 6:
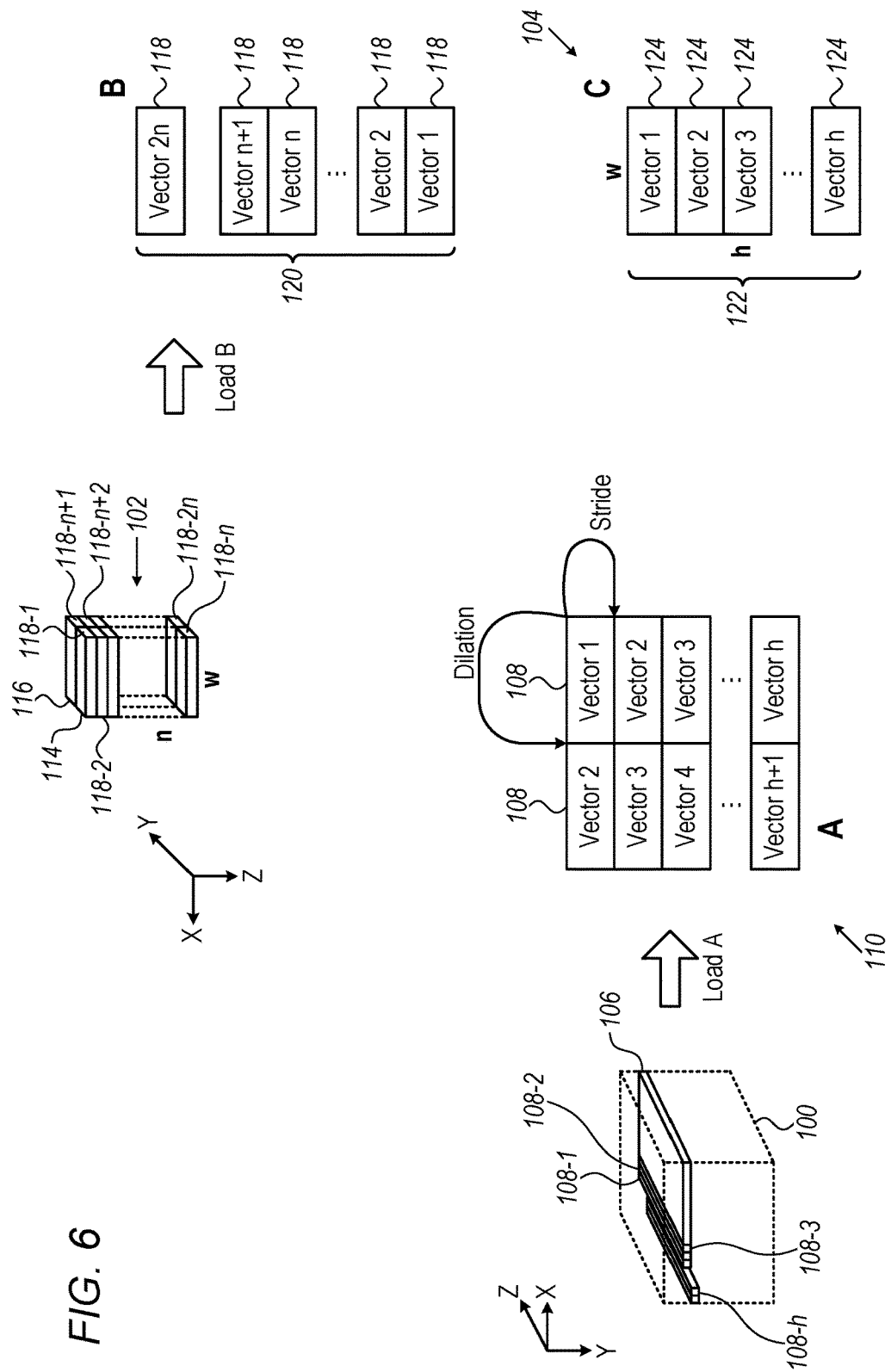
FIG. 6 is a block diagram that schematically shows details of a stage in computation of a convolution, in accordance with an embodiment of the invention.

FIG. 6 is a block diagram that schematically shows details of a stage in computation of a convolution by engine 20, in accordance with another embodiment of the invention, exemplifying some of the functions that were explained above. In this example, an input tensor (A) 100 is to be convolved with a kernel tensor (B) 102, with stride and dilation equal to 1, to give an output tensor (C) 104. For this purpose, data access logic 31 extracts a sub-tensor 106 from tensor 100 comprising h vectors 108 of length n, and then lowers this sub-tensor to create a matrix 110 comprising two sets of these vectors, having dimensions 2n×h. Similarly, data access logic 31 extracts two columns 114, 116 from tensor 102, each comprising n vectors 118 of length w, and lowers this sub-tensor to create a matrix 120 of dimensions w×2n.

Processing elements 24 in execution unit 22 multiply matrices 110 and 120 together, as described above, to give an output matrix 124 of dimensions w×h. Matrix 124 is heightened by data access logic 31 to the appropriate sub-tensor location in output tensor 104. This process then continues with extraction and convolution of the next sub-tensor from tensor 100.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computational apparatus, comprising:
a memory, which is configured to contain first and second input matrices of input data values, having at least three dimensions including respective heights and widths in a predefined sampling space and a common depth in a feature dimension, orthogonal to the predefined sampling space;
an array of processing elements arranged in hardware logic as a grid of array rows and array columns, each processing element configured to perform a multiplication of respective first and second input operands and to accumulate products of the multiplication to generate a respective output value; and
data access logic, which comprises:
at least one load unit, which is configured to extract from the memory first and second pluralities of vectors of the input data values extending in the feature dimension from the first and second input matrices, respectively; and
a data manipulation unit, which is configured to distribute the input data values in the first plurality of the vectors in sequence to at least a first array row in the array of the processing elements, and to distribute the input data values in the second plurality of the vectors in sequence to at least a first array column in the array of the processing elements,
so as to cause the processing elements in the array to compute a convolution of first and second two-dimensional (2D) matrices composed respectively of the first and second pluralities of vectors.

2. The apparatus according to claim 1, wherein the data access logic is configured to transpose at least one of the 2D matrices before distributing the input data values.

3. The apparatus according to claim 2, wherein the first 2D matrix is transposed so that the vectors in the first plurality are arranged as columns of the first 2D matrix, while the vectors in the second plurality are arranged as rows of the second 2D matrix.

4. The apparatus according to claim 1, wherein the sequence in which the input data values are distributed to the array of the processing elements is selected so that the array of the processing elements computes respective outer products of a succession of vector pairs, each vector pair comprising a first vector selected from the first plurality and a second vector selected from the second plurality, and sums the outer products to generate a third matrix representing a result of the convolution.

5. The apparatus according to claim 4, wherein the data access logic is configured to broadcast the input data values in each vector pair to the array of the processing elements so that each input data value is distributed to multiple processing elements among the processing elements in the array, such that in each of a succession of processing cycles, the array of the processing elements computes all matrix elements of an outer product of the first and second vectors.

6. The apparatus according to claim 1, wherein the data access logic is configured to retrieve the vectors of the input data values from non-neighboring locations in the predefined sampling space.

7. The apparatus according to claim 6, wherein the locations in the predefined sampling space are separated by a predefined stride or dilation.

8. The apparatus according to claim 1, wherein the data access logic is configured to extract the first and second pluralities of the vectors beginning from respective start offsets that are not aligned with boundaries of the first and second input matrices in the predefined sampling space.

9. The apparatus according to claim 1, wherein the data access logic is configured to extract the first and second pluralities of the vectors from respective regions of interest that contain the first and second input matrices and include margins extending beyond respective boundaries of the first and second matrices in the predefined sampling space, while inserting specified padding values in the vectors that are extracted from the margins.

10. A computational method, comprising:
storing in a memory first and second input matrices of input data values, having at least three dimensions including respective heights and widths in a predefined sampling space and a common depth in a feature dimension, orthogonal to the predefined sampling space;

extracting from the memory, by at least one load unit, first and second pluralities of vectors of the input data values extending in the feature dimension from the first and second input matrices, respectively;

distributing, by a data manipulation unit, the input data values to an array of processing elements arranged in hardware logic as a grid of array rows and array columns, each processing element configured to perform a multiplication of respective first and second input operands and to accumulate products of the multiplication to generate a respective output value, such that the input data values in the first plurality of the vectors are distributed in sequence to at least a first array row in the array of the processing elements, and the input data values in the second plurality of the vectors are distributed in sequence to at least a first array column in the array of the processing elements; and multiplying the distributed data values and accumulating the products in the processing elements in the array so as to compute a convolution of first and second two-dimensional (2D) matrices composed respectively of the first and second pluralities of vectors.

11. The method according to claim 10, wherein distributing the input data values comprises transposing at least one of the 2D matrices before delivering the extracted data values to the array of the processing elements.

12. The method according to claim 11, wherein the first 2D matrix is transposed so that the vectors in the first plurality are arranged as columns of the first 2D matrix, while the vectors in the second plurality are arranged as rows of the second 2D matrix.

13. The method according to claim 10, wherein the sequence in which the input data values are distributed to the array of the processing elements is selected so that the array of the processing elements computes respective outer products of a succession of vector pairs, each vector pair comprising a first vector selected from the first plurality and a second vector selected from the second plurality, and sums the outer products to generate a third matrix representing a result of the convolution.

14. The method according to claim 13, wherein distributing the input data values comprises broadcasting the input data values in each vector pair to the array of the processing elements so that each extracted data value is distributed to multiple processing elements among the processing elements in the array, such that in each of a succession of processing cycles, the array of the processing elements computes all matrix elements of an outer product of the first and second vectors.

15. The method according to claim 10, wherein distributing the input data values comprises retrieving the vectors of the input data values from non-neighboring locations in the predefined sampling space.

16. The method according to claim 15, wherein the locations in the predefined sampling space are separated by a predefined stride or dilation.

17. The method according to claim 10, wherein one or more of the first and second pluralities of the vectors are extracted beginning from respective start offsets that are not aligned with boundaries of the first and second input matrices in the predefined sampling space.

18. The method according to claim 10, wherein one or more of the first and second pluralities of the vectors are extracted from respective regions of interest that contain the first and second input matrices and include margins extending beyond respective boundaries of the first and second matrices in the predefined sampling space, and wherein distributing the data values comprises inserting specified padding values in the vectors that are extracted from the margins.

* * * * *